US007553902B2

(12) United States Patent
Haeberle et al.

(10) Patent No.: US 7,553,902 B2
(45) Date of Patent: Jun. 30, 2009

(54) WATER-EMULSIFIABLE ISOCYANATES HAVING IMPROVED PROPERTIES

(75) Inventors: Karl Haeberle, Speyer (DE); Rainer Koeniger, Clifton Park, NY (US); Eva Wagner, Speyer (DE); Klaus Dieter Hoerner, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/522,715

(22) PCT Filed: Jul. 24, 2003

(86) PCT No.: PCT/EP03/08099

§ 371 (c)(1),
(2), (4) Date: Jan. 28, 2005

(87) PCT Pub. No.: WO2004/022624

PCT Pub. Date: Mar. 18, 2004

(65) Prior Publication Data

US 2005/0245675 A1  Nov. 3, 2005

(30) Foreign Application Priority Data

Aug. 15, 2002  (DE) ................ 102 38 146

(51) Int. Cl.
*B05D 3/02* (2006.01)
*C08J 3/00* (2006.01)
*C08K 3/20* (2006.01)
*C08L 75/00* (2006.01)
*C09J 4/00* (2006.01)
*C09J 101/00* (2006.01)
*C09J 201/00* (2006.01)

(52) U.S. Cl. ............... 524/590; 156/330.9; 156/331.4; 156/331.7; 427/372.2; 427/385.5; 524/589; 524/591; 524/839; 524/840

(58) Field of Classification Search ........... 524/589, 524/590, 591, 839, 840; 427/372.2, 385, 427/385.5; 156/330.9, 331.4, 331.7
See application file for complete search history.

(56) References Cited

U.S. PATENT DOCUMENTS

| 2,979,485 | A | * | 4/1961 | Burkus .......................... 528/49 |
| 3,144,452 | A | * | 8/1964 | Wild et al. ................... 544/193 |
| 3,479,310 | A | | 11/1969 | Dieterich et al. |
| 3,769,318 | A | | 10/1973 | Windemuth et al. |
| 4,092,286 | A | | 5/1978 | Noll et al. |
| 4,108,814 | A | | 8/1978 | Reiff et al. |
| 4,190,566 | A | | 2/1980 | Noll et al. |
| 4,663,377 | A | * | 5/1987 | Hombach et al. ............ 524/196 |
| 4,687,813 | A | * | 8/1987 | Lenz et al. ................... 525/131 |
| 5,387,367 | A | * | 2/1995 | Haeberle et al. ......... 252/182.22 |
| 5,856,420 | A | | 1/1999 | Tucker et al. |
| 6,426,414 | B1 | * | 7/2002 | Laas et al. ................... 544/222 |
| 6,472,493 | B1 | * | 10/2002 | Huynh-Ba ................... 528/49 |

FOREIGN PATENT DOCUMENTS

| DE | 26 51 505 | 5/1978 |
| DE | 27 32 131 | 1/1979 |
| DE | 28 11 148 | 9/1979 |
| DE | 40 01 783 | 7/1991 |
| DE | 41 13 160 | 10/1992 |
| DE | 42 03 510 | 8/1993 |
| DE | 197 24 199 | 12/1998 |
| DE | 198 22 890 | 11/1999 |
| DE | 198 47 077 | 11/1999 |
| DE | 199 58 170 | 6/2001 |
| DE | 100 07 820 | 8/2001 |
| DE | 101 61 156 | 6/2003 |
| EP | 0 000 194 | 1/1979 |
| EP | 0 129 813 | 1/1985 |
| EP | 0 206 059 | 12/1986 |
| EP | 0 486 881 | 5/1992 |
| EP | 0 531 820 | 3/1993 |
| EP | 0 540 985 | 5/1993 |
| EP | 0 548 669 | 6/1993 |
| EP | 0 582 166 | 2/1994 |
| EP | 0 649 866 | 4/1995 |
| EP | 0 697 424 | 2/1996 |
| EP | 0 703 255 | 3/1996 |
| EP | 0 728 785 | 8/1996 |
| EP | 0 754 713 | 1/1997 |
| EP | 0 959 087 | 11/1999 |
| EP | 0 959 115 | 11/1999 |
| GB | 994 890 | 6/1965 |
| GB | 1 076 688 | 7/1967 |
| WO | 01 38415 | 5/2001 |

OTHER PUBLICATIONS

Odian, George, Principles of Polymerization, Third Edition, 1991, pp. 29-33.*
Edited by Stoye, D. et al. "Lackharze", Hanser, p. 195 1996.
see Houben-Weyl, Methoden der organischen Chemie, 4$^{th}$ ed., vol. E20, pp. 217-226.

* cited by examiner

*Primary Examiner*—Patrick D Niland
(74) *Attorney, Agent, or Firm*—Oblon, Spivak, McClelland, Maier & Neustadt, P.C.

(57) ABSTRACT

Mixtures comprising
(A) an isocyanurate and/or biuret of 1,6-diisocyanatohexane (HDI),
(B) an isocyanurate of 1-isocyanato-3,5,5-trimethyl-5-isocyanatomethylcyclohexane (IPDI),
(C) at least one emulsifier, and
(D) if desired, solvent.

14 Claims, No Drawings

WATER-EMULSIFIABLE ISOCYANATES HAVING IMPROVED PROPERTIES

The invention relates to water-emulsifiable isocyanates possessing improved emulsifiability and featuring increased hardness of coatings obtained using them, to processes for preparing them, and to their use.

Water-emulsifiable polyisocyanates are added as crosslinking agents to aqueous polymer dispersions and have been widely described in the literature. Emulsifiability in water is brought about by blending the polyisocyanates with emulsifiers which are obtained by reacting the polyisocyanates with hydrophilic molecules.

Hydrophilic molecules commonly used include nonionic hydrophilic molecules such as polyalkylene oxide alcohols.

EP-A2 206 059 describes water-dispersible polyisocyanate formulations comprising an aliphatic polyisocyanate and a reaction product of an aliphatic polyisocyanate with a monohydric or polyhydric, nonionic polyalkylene ether alcohol emulsifier which has at least one polyether chain containing at least 10 ethylene oxide units. As suitable polyisocyanates, extensive lists are given of aliphatic and cycloaliphatic diisocyanates, more preferably isocyanurates and biurets based on 1,6-diisocyanatohexane (HDI) and/or isocyanurates based on 1-isocyanato-3,5,5-trimethyl-5-isocyanatomethylcyclohexane (IPDI).

EP-A1 540 985 likewise describes polyisocyanate mixtures, but in this case the polyether chains have an average ethylene oxide unit content of from 5.0 to 9.9.

EP-A2 486 881 describes nonaqueous aliphatic polyisocyanate formulations comprising polyisocyanates from a list of aliphatic polyisocyanates and comprising an amount, sufficient to ensure the dispersibility of the aliphatic polyisocyanate, of a reaction product of an aromatic or aliphatic diisocyanate and a monohydric or polyhydric polyalkylene ether alcohol having at least 8 ethylene oxide units in the polyether chain.

DE-A1 199 58 170 describes polyether-modified, water-dispersible polyisocyanate mixtures which have been modified with monohydric polyalkylene oxide polyether alcohols. Very particular preference is given to polyisocyanates or polyisocyanate mixtures with an isocyanurate structure based on HDI, IPDI and/or 4,4'-diisocyanatodicyclohexylmethane.

DE-A1 198 22 890 describes aqueous two-component polyurethane coating systems whose hardener component is prepared from polyalkylene oxide polyether alcohols and aliphatically and/or cycloaliphatically attached isocyanate groups, preferably isocyanurate structures based on HDI, IPDI and/or 4,4'-diisocyanatodicyclohexylmethane, under allophanatization conditions. The predominant attachment of polyether chains by way of allophanate groups is also known from DE-A1 198 47 077.

Nonionic emulsifiers described include polyvinylpyrrolidone-modified polyisocyanates (EP-A2 754 713).

Also in use as actively dispersing units are polyalkylene oxide ethers containing carboxylic acid groups, as described in DE-A1 100 07 820 and DE-A1 41 13 160, or polyether ester alcohols (EP-A1 728 785).

DE-A1 40 01 783 describes polyisocyanate mixtures which, with a uretdione content of 1 to 23% by weight, contain chemically bonded carboxyl groups for dispersibility.

Furthermore, carboxyl-containing compounds are described as emulsifiers (EP-A2 548 669), tertiary amino and/or ammonium groups (EP-A1 582 166 and EP-A1 531 820), acidic esters of phosphoric acid (DE-A1 197 24 199) or sulfonic acids (EP-A1 703 255).

A disadvantage of the polyisocyanate mixtures described is that they do not meet the requirements imposed on the hardness of the coatings obtainable using them.

Water-emulsifiable isocyanates can be dissolved in organic solvents such as, for example, carbonic esters or lactones for the purpose of improving dispersibility, as described in EP-A 697 424.

From "Lackharze" [Resins for Coatings] (edited by D. Stoye and W. Freitag, Hanser 1996, p. 195) it is known that IPDI trimer, which gives resins for coatings a comparatively high level of hardness, even going as far as brittleness, is frequently employed in blends with HDI derivatives in order to lessen the hardness.

Users require the water-emulsifiable isocyanates to have the following properties:
1. The isocyanate should be easy to emulsify; having to use demanding apparatus such as high-shear stirring elements is deprecated.
2. The emulsion should be fine, since otherwise the gloss may be disrupted or turbidity may appear, for example.
3. In the case of coatings, a frequent desire is for a high ultimate hardness.
4. The ultimate hardness should be attained as quickly as possible.

It is an object of the present invention to provide water-emulsifiable polyisocyanates which exhibit improved emulsifiability properties and with which it is possible to produce coatings having high hardness, rapid increase in hardness, and enhanced emulsifiability at the same time.

We have found that this object is achieved by mixtures comprising (A) an isocyanurate and/or biuret of 1,6-diisocyanatohexane (HDI), (B) an isocyanurate of 1-isocyanato-3,5,5-trimethyl-5-isocyanatomethylcyclohexane (IPDI), (C) at least one emulsifier, and (D) if desired, solvent.

The mixtures of the invention prove readily emulsifiable, lead to a fine, stable emulsion, and can be used to give coatings which exhibit a rapid increase in hardness and a high ultimate hardness.

Polyisocyanates (A) are isocyanurates (A1) and/or biurets (A2) of 1,6-diisocyanatohexane (HDI). In accordance with the invention this includes those polyisocyanates composed to an extent of at least 50% by weight, preferably at least 66%, more preferably at least 75%, very preferably at least 85%, and in particular at least 95% by weight, of compounds of the formula (Ia) and/or (Ib),

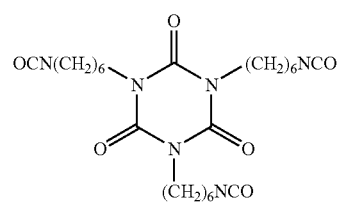

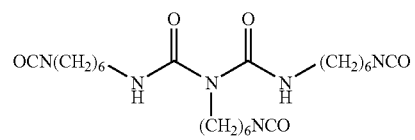

and their higher homologues.

The composition of the polyisocyanates, i.e., for example, the fractions of isocyanurates and/or biurets and their higher homologues, and the average functionality are determined in this specification by gel permeation chromatography using polystyrene as standard and tetrahydrofuran as eluent.

Polyisocyanates (B) are isocyanurates of 1-isocyanato-3,5,5-trimethyl-5-isocyanatomethylcyclohexane (IPDI). In accordance with the invention, this includes those polyisocyanates which are composed to an extent of at least 50% by weight, preferably at least 66%, more preferably at least 75%, very preferably at least 85%, and in particular at least 95% by weight, of the compound of the formula (II),

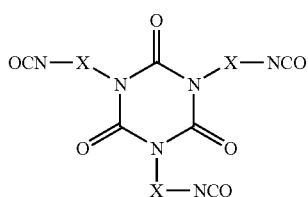

in which X is

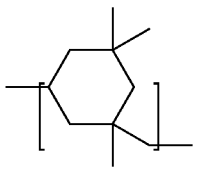

and their higher homologues.

Suitable emulsifiers (C) in accordance with the invention are compounds obtainable by reacting at least part of one of the abovementioned compounds (A) and/or (B) with at least one component (C1) containing at least one group which is reactive toward isocyanate groups and containing at least one hydrophilic group. (C1) is referred to below as "hydrophile".

Examples of isocyanate-reactive groups are hydroxyl groups (—OH), unsubstituted or monosubstituted amino groups or mercapto groups (—SH), preferably hydroxyl groups.

Generally, therefore, the emulsifiers (C) contain component (C1) in chemically attached form.

The components (C1) may, for example, comprise compounds such as are known in the prior art: for example, from the prior art cited in the introduction.

In particular, these may be compounds which contain at least one isocyanate-reactive group and
 (C1a) at least one cationic hydrophilic group,
 (C1b) at least one anionic hydrophilic group or
 (C1c) at least one nonionic hydrophilic group.

Preferred compounds (C1) contain 1 to 3 isocyanate-reactive groups and 1 to 3 hydrophilic groups, more preferably 1 to 2 isocyanate-reactive groups and 1 to 2 hydrophilic groups, and very preferably one isocyanate-reactive group and one hydrophilic group.

Compounds (C1a) contain at least one isocyanate-reactive group and at least one cationic hydrophilic group or at least one hydrophilic group which can be converted into a cationic group, and are, for example, compounds such as those described in EP-A1 582 166, especially from page 5 line 42 to page 8 line 22 and in particular from page 9 line 19 to page 15 line 34 therein, or in EP-A1 531 820, especially from page 3 line 21 to page 4 line 57 therein, or in DE-A1 42 03 510, especially from page 3 line 49 to page 5 line 35 therein. Those documents are explicitly incorporated into the present disclosure content by reference.

Compounds (C1b) contain at least one isocyanate-reactive group and at least one anionic hydrophilic group or at least one hydrophilic group which can be converted into an anionic group, and are, for example, compounds as described in EP-A1 703 255, especially from page 3 line 54 to page 4 line 38 therein, in DE-A1 197 24 199, especially on page 3 lines 4 to 30 therein, in DE-A1 40 10 783, especially column 3 lines 3 to 40 therein, in DE-A1 41 13 160, especially from column 3 line 63 to column 4 line 4 therein, and in EP-A2 548 669, especially from page 4 line 50 to page 5 line 6 therein. Those documents are expressly hereby incorporated into the present disclosure content by reference.

Compounds (C1c) contain at least one isocyanate-reactive group and at least one nonionic hydrophilic group and are for example compounds as described in EP-A2 754 713, especially on page 3 lines 31 to 51 therein, in EP-A2 206 059, especially on page 8 line 33 to page 9 line 26 therein, in EP-A2 486 881, especially on page 2 lines 42 to 54 therein, in EP-A1 540 985, especially on page 4 lines 43 to 58 therein, in EP-A1 728 785, especially on page 4 line 55 to page 5 line 54 therein, in EP-A1 959 115, especially on page 4 lines 23 to 46 therein, in DE-A1 199 58 170, especially on page 4 lines 22 to 48 therein, and in DE-A1 100 07 820, especially from page 4 line 10 to page 5 line 12 therein. Those documents are hereby expressly incorporated into the present disclosure content by reference.

The hydrophiles (C1) are preferably compounds (C1c) containing at least one isocyanate-reactive group and at least one nonionic hydrophilic group.

Particularly preferred hydrophiles (C1c) are polyalkylene oxide polyether alcohols obtainable by alkoxylating suitable initiator molecules.

Suitable initiator molecules for the preparation of monohydric polyalkylene oxide polyether alcohols are thiol compounds, monohydroxy compounds of the formula $R^1$—O—H or secondary monoamines of the formula $R^2R^3N$—H, in which $R^1$, $R^2$, and $R^3$ independently of one another are each $C_1$-$C_{18}$ alkyl, $C_2$-$C_{18}$ alkyl uninterrupted or interrupted by one or more oxygen and/or sulfur atoms and/or by one or more substituted or unsubstituted imino groups, or are $C_6$-$C_{12}$ aryl, $C_5$-$C_{12}$ cycloalkyl or a five- or six-membered heterocycle containing oxygen, nitrogen and/or sulfur atoms, or $R^2$ and $R^3$ together form an unsaturated, saturated or aromatic ring whose members are uninterrupted or interrupted by one or more oxygen and/or sulfur atoms and/or by one or more substituted or unsubstituted imino groups, it being possible for the radicals mentioned each to be substituted by functional groups, aryl, alkyl, aryloxy, alkyloxy, halogen, heteroatoms and/or heterocycles.

Preferably $R^1$ is $C_1$ to $C_4$ alkyl, i.e., methyl, ethyl, isopropyl, n-propyl, n-butyl, iso-butyl, sec-butyl or tert-butyl; very preferably $R^1$ is methyl.

Examples of suitable monofunctional initiator molecules may be saturated monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Alkylene oxides suitable for the alkoxylation reaction are ethylene oxide, propylene oxide, iso-butylene oxide, vinyloxirane and/or styrene oxide, which may be used in any order or else in a mixture in the alkoxylation reaction.

Preferred alkylene oxides are ethylene oxide, propylene oxide, and mixtures thereof; particular preference is given to ethylene oxide.

Preferred compounds (C1c) are polyether alcohols based on polyalkylene oxide polyether alcohols prepared using saturated aliphatic or cycloaliphatic alcohols of the abovementioned type as initiator molecules. Very particular preference is given to those based on polyalkylene oxide polyether alcohols prepared using saturated aliphatic alcohols having 1 to 4 carbon atoms in the alkyl radical. Polyalkylene oxide polyether alcohols prepared starting from methanol are especially preferred.

The monohydric polyalkylene oxide polyether alcohols contain on average generally from 5 to 35, preferably from 7 to 30, more preferably from 7 to 25, very preferably from 10 to 22, alkylene oxide units per molecule, in particular from 10 to 22 ethylene oxide units.

Preferred polyether alcohols (C1c) are, therefore, compounds of the formula

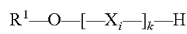

where $R^1$ is as defined above, k is an integer from 5 to 35, preferably from 7 to 30, more preferably from 7 to 25, and in particular from 10 to 22, and each $X_i$ can be selected, independently of one another for i=1 to k, from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group consisting of —$CH_2$—$CH_2$—O—, —$CH_2$—$CH(CH_3)$—O— and —$CH(CH_3)$—$CH_2$—O—, and more preferably —$CH_2$—$CH_2$—O— where Ph is phenyl and Vin is vinyl.

The polyether alcohols may further contain, as hydrophilic synthesis components, minor amounts of other isocyanate-reactive compounds containing anionic or cationic groups—for example, with carboxylate, sulfonate or ammonium groups. This, however, is less preferred.

To prepare the component which is active as emulsifier (C) the starting components (A) and/or (B) are reacted with one another at temperatures from 40 to 180° C., preferably 50 to 150° C., observing an NCO/OH equivalents ratio of from 1:1 to 100:1, preferably from 1:1 to 50:1, more preferably from 1.5:1 to 20:1.

The reaction time is generally 10 min to 5 hours, preferably 15 min to 4 hours, more preferably 20 to 180 min, and very preferably 30 to 120 min.

The emulsifier (C), for example, may
1) first be prepared from at least one compound (C1) and at least part of (A) and then admixed with the other components (B) and, where appropriate, (A),
2) first be prepared from at least one compound (C1) and at least part of (B) and then admixed with the remaining components (A) and, where appropriate, (B), or
3) first be prepared from at least one compound (C1) and at least part of (A) and (B) and then admixed, where appropriate, with the remaining components (B) and (A).

Preference is given to variants 1) and 2).

In order to accelerate the reaction it is possible where appropriate to use suitable catalysts.

These are the customary catalysts which are known for these purposes, examples being metal carboxylates, metal chelates or tertiary amines of the type described in GB-A-0 994 890, alkylating agents of the type described in U.S. Pat. No. 3,769,318, or strong acids as described by way of example in EP-A-0 000 194.

Suitable catalysts are, in particular, zinc compounds, such as zinc(II) stearate, zinc(II) n-octanoate, zinc(II) 2-ethyl-1-hexanoate, zinc(II) naphthenate or zinc(II) acetylacetonate, tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminum tri(ethyl acetoacetate), iron(III) chloride, potassium octoate, manganese compounds, cobalt compounds or nickel compounds, and strong acids, such as trifluoroacetic acid, sulfuric acid, hydrogen chloride, hydrogen bromide, phosphoric acid or perchloric acid, for example, or any desired mixtures of these catalysts.

Suitable though less preferred catalysts for the process are also those catalysts as described for example in EP-A-0 649 866 on page 4 line 7 to page 5 line 15.

Preferred catalysts for the process of the invention are zinc compounds of the abovementioned type. Very particular preference is given to using zinc(II) n-octanoate, zinc(II) 2-ethyl-1-hexanoate and/or zinc(II) stearate.

Where used, these catalysts are employed in an amount of from 0.001 to 5% by weight, preferably 0.005 to 1% by weight, based on the overall weight of the reactants.

The polyaddition reaction for preparing the polyurethane formulation of the invention may take place with particular preference in the presence of cesium salts, as described in the earlier German patent application of Dec. 12, 2001 bearing the reference 10161156.0. Preferred cesium salts are compounds in which the following anions are employed: F—, Cl—, ClO—, $ClO_3$—, $ClO_4$—, Br—, I—, $IO_3$—, CN—, OCN—, $NO_2$—, $NO_3$—, $HCO_3$—, $CO_3^{2-}$—, $S^{2-}$—, SH—, $HSO_3$—, $SO_3^{2-}$—, $HSO_4$—, $SO_4^{2-}$—, $S_2O_2^{2-}$—, $S_2O_4^{2-}$—, $S_2O_5^{2-}$—, $S_2O_6^{2-}$—, $S_2O_7^{2-}$—, $S_2O_8^{2-}$—, $H_2PO_2$—, $H_2PO_4$—, $HPO_4^{2-}$—, $PO_4^{3-}$—, $P_2O_7^{4-}$—, $(OC_nH_{2n+1})$—, $(C_nH_{2n-1}O_2)$—, $(C_nH_{2n-3}O_2)$—, and $(C_{n+1}H_{2n-2}O_4)^{2-}$—, n standing for numbers from 1 to 20.

Particularly preferred compounds are cesium carboxylates in which the anion is of the formula $(C_nH_{2n-1}O_2)$— or $(C_{n+1}H_{2n-2}O_4)^{2-}$— where n is from 1 to 20. Especially preferred cesium salts contain monocarboxylate anions of the formula $(C_nH_{2n-1}O_2)$— where n stands for numbers from 1 to 20. Particular mention may be made here of formate, acetate, propionate, hexanoate, and 2-ethylhexanoate.

The cesium salts are used in amounts of from 0.01 to 10 mmol of cesium salt per kg of solvent-free reaction mixture. They are preferably used in amounts of from 0.05 to 2 mmol of cesium salt per kg of solvent-free reaction mixture.

The cesium salts can be added to the reaction mixture in solid form, but preferably in dissolved form. Suitable solvents are polar, aprotic solvents or else protic solvents. Particularly suitable besides water are alcohols; especially suitable are polyols, such as are also used as synthesis units for polyurethanes, such as ethane-, propane-, and butane-diols, for example. The use of the cesium salts makes it possible to carry out the polyaddition reaction under the customary conditions.

Addition to the reaction mixture may take place by any desired method. Thus, for example, it is possible to admix the catalyst (where used) either to the polyisocyanate component (A), (B) and/or to the emulsifier component (C1) before the beginning of the actual reaction. It is also possible to add the catalyst to the reaction mixture at any time during the reaction or else, in a two-stage reaction regime, following the urethanization, i.e., when the NCO content corresponding theoretically to complete conversion of isocyanate and hydroxyl groups has been reached.

The sequence in which components (A), (B), and (C) are mixed is not critical to the invention: for example, the components may be mixed with one another simultaneously, (C), or at least part of it, can be included in an initial charge and then (A) and/or (B) added to that initial charge, or (A) or (B), at least in part, can be included in an initial charge, (C) can be added, and then the last component can be added.

The course of the reaction can be monitored by determining the NCO content by means, for example, of titrimetry. When the target NCO content has been reached the reaction is terminated. In the case of a purely thermal reaction regime, this can be done, for example, by cooling the reaction mixture to room temperature. Where a catalyst of the aforementioned type is used, however, the reaction is generally stopped by adding suitable deactivators. Examples of suitable deactivators include organic or inorganic acids, the corresponding acid halides, and alkylating agents. Examples that may be mentioned include phosphoric acid, monochloroacetic acid, dodecylbenzenesulfonic acid, benzoyl chloride, dimethyl sulfate, and, preferably, dibutyl phosphate and also di-2-ethylhexyl phosphate. The deactivators can be used in amounts of from 1 to 200 mol %, preferably from 20 to 100 mol %, based on the number of moles of catalyst.

The resultant polyisocyanate mixtures generally have an NCO content of preferably 6.0 to 23.0% by weight, more preferably 8.5 to 22.0% by weight.

The resulting polyisocyanate mixtures generally have a viscosity at 23° C. of preferably 0.2 to 20 Pas, more preferably 0.5 to 8 Pas.

The process may be carried out where appropriate in a suitable solvent (D) which is inert toward isocyanate groups. Examples of suitable solvents are the conventional paint solvents known per se, such as ethyl acetate, butyl acetate, ethylene glycol monomethyl or monoethyl ether acetate, 1-methoxy-2-propyl acetate, 3-methoxy-n-butyl acetate, acetone, 2-butanone, iso-butyl methyl ketone, 4-methyl-2-pentanone, cyclohexanone, cyclopentanone, toluene, xylene, chlorobenzene, white spirit, aromatics with relatively high degrees of substitution, such as are sold, for example, under the names Solventnaphtha®, Solvesso®, Shellsol®, Isopar®, Nappar® and Diasol®, propylene glycol diacetate, diethylene glycol dimethyl ether, dipropylene glycol dimethyl ether, diethylene glycol ethyl and butyl ether acetate, N-methylpyrrolidone, and N-methylcaprolactam, and also, preferably, carbonic esters or lactones, which are specified in EP-A1 697 424, page 4 lines 4 to 32, more preferably dimethyl carbonate, diethyl carbonate, 1,2-ethylene carbonate and 1,2-propylene carbonate, lactones such as β-propiolactone, γ-butyrolactone, ε-caprolactone, and ε-methylcaprolactone, or else any desired mixtures of such solvents.

It is also possible first to prepare the isocyanates of the invention without solvent and then to use a solvent (D) to take up the product thus obtainable.

The mixtures of the invention preferably comprise in solvent-free form
(A) 30-90%, preferably 50 to 90%, by weight,
(B) 5-60%, preferably 5 to 50%, by weight, and
(C1) 5-40%, preferably 5 to 30%, by weight, the sum of (A), (B), and (C1) making 100% by weight, and including in each case the isocyanate (A) and/or (B) prepared to prepare the emulsifier (C).

Based on the total mixture, the solvent (D) may be present in amounts of from 0 to 60% by weight, preferably in amounts of from to 50% by weight.

The mixtures of the invention may be dispersed preferably in water for the purpose of preparing aqueous dispersions; with particular preference, the mixtures of the invention are mixed into aqueous dispersions.

The polyisocyanate formulation of the invention is suitable for modifying aqueous coating materials (paints, protective coatings) for substrates such as wood, wood veneer, paper, paperboard, cardboard, textile, leather, nonwoven, plastics surfaces, glass, ceramic, mineral building materials such as cement moldings and fiber cement slabs, coated or uncoated metals, adhesives or impregnating compositions, for dyeing, for example, based on aqueous dispersions or solutions with a solids content of from 5 to 40% by weight, preferably from 5 to 20% by weight. Suitable coating materials include the aqueous dispersions, known per se, of homopolymers and copolymers of olefinically unsaturated monomers or polyurethanes or else solutions of natural substances, such as of casein, for example.

The polyisocyanate formulations of the invention are added to the aqueous coating materials generally in an amount of 1 to 25% by weight, preferably from 2.5 to 20% by weight, based on the solids content of the coating material.

They are applied to the substrate in a known manner by means, for example, of spraying at a rate of from 5 to 50 g solids/m².

Suitable dispersions of homopolymers or copolymers of olefinically unsaturated monomers are, for example, conventional dispersions of homopolymers or copolymers based on vinyl esters of carboxylic acids having 2 to 18, preferably 2 to 4, carbon atoms such as vinyl acetate in particular, where appropriate with up to 70% by weight, based on the total amount of olefinically unsaturated monomers, of other olefinically unsaturated monomers, and/or of homopolymers or copolymers of (meth)acrylic esters of alcohols having 1 to 18, preferably 1 to 4, carbon atoms, such as (meth)acrylic acid, methyl, ethyl, propyl, hydroxyethyl or hydroxypropyl esters in particular, together where appropriate with up to 70% by weight of other olefinically unsaturated monomers, and/or butadiene-styrene copolymers having a butadiene content of about 20 to 60% by weight, and/or of other diene polymers or copolymers such as polybutadiene or copolymers of butadiene with other olefinically unsaturated monomers such as styrene, acrylonitrile and/or methacrylonitrile, for example, and/or aqueous dispersions of polymers or copolymers of 2-chloro-1,3-butadiene, where appropriate with other olefinically unsaturated monomers of the type exemplified above, e.g., those with a chlorine content of about 30 to 40% by weight, in particular a chlorine content of about 36% by weight.

Preference is given to aqueous dispersions of copolymers of 90 to 99.5% by weight of acrylates or methacrylates of alkanols containing 1 to 4 carbon atoms and 0.5 to 10% by weight, based in each case on the copolymer, of hydroxyalkyl acrylates and methacrylates having 2 to 20 carbon atoms in the hydroxyalkyl radical, such as hydroxyethyl, hydroxypropyl or hydroxybutyl acrylate or methacrylate. Such dispersions are known per se and can be prepared conventionally by emulsion polymerization (see Houben-Weyl, Methoden der organischen Chemie, 4$^{th}$ edition, vol. E 20, p. 217 ff.).

Suitable aqueous polyurethane dispersions are those of the type known per se, as described in, for example, U.S. Pat. No. 3,479,310, GB-A 1,076,688, U.S. Pat. Nos. 4,108,814, 4,092, 286, DE-A 2 651 505, U.S. Pat. No. 4,190,566, DE-A 2 732 131 or DE-A 2 811 148.

The aqueous dispersions used may comprise the customary auxiliaries and additives. These include, for example, fillers, such as quartz powder, quartz sand, highly dispersed silica, heavy spar, calcium carbonate, chalk, dolomite or talc, which are often used together with suitable wetting agents such as polyphosphates, for example, such as sodium hexametaphosphate, naphthalenesulfonic acid, ammonium or sodium salts of polyacrylic acids, the wetting agents being added generally in amounts of from 0.2 to 0.6% by weight, based on filler.

Further suitable auxiliaries are organic thickeners to be used in amounts, for example, of from 0.01 to 1% by weight, based on the dispersion, such as cellulose derivatives, alginates, starch or starch derivatives or polyacrylic acid, or inorganic thickeners to be used in amounts of from 0.05 to 5% by weight, based on the dispersion, such as bentonites, for example.

Fungicides for preservation may also be added to the dispersions. These are employed generally in amounts of from 0.02 to 1% by weight, based on the dispersion. Examples of suitable fungicides are phenol and cresol derivatives and also organotin compounds.

Substrates for impregnation are, for example, synthetic or nonsynthetic fibers and/or woven or nonwoven fabrics comprising such fibers.

The mixtures of the invention can be dispersed very finely in aqueous dispersions. The resulting dispersions are very stable on storage. Moreover, little of the water-emulsifiable polyisocyanate need be added in order to set the desired properties of the dispersion or to achieve the desired properties during application.

The mixtures of the invention can of course be provided with customary auxiliaries and additives of coatings technology. These include, for example, defoamers, thickeners, leveling assistants, pigments, emulsifiers, dispersing assistants, and also solvents. The desired processing viscosity is set by adding water.

To prepare the dispersions it is sufficient in the majority of cases to use simple emulsifying techniques, for example, with a mechanical stirrer, or else in many cases simple mixing of the two components by hand, in order to obtain dispersions having very good properties. Naturally it is also possible, however, to employ mixing techniques involving a relatively high shearing energy, such as jet dispersion, for example.

The coating materials comprising the mixtures of the invention may be used in particular as primers, surfacers, pigmented topcoat materials, and clearcoat materials in the sector of automotive refinish or the painting of large-size vehicles. The coating materials are particularly suitable for applications where particularly high application reliability, outdoor weathering stability, optical properties, solvent resistance, chemical resistance, and water resistance are required, such as in automotive refinishing and the painting of large-size vehicles.

The coating materials comprising the mixtures of the invention may be applied by any of a wide variety of spraying methods, such as, for example, air-pressure, airless or electrostatic spraying methods using one-component or two-component spraying units, or else by spraying, troweling, knife coating, brushing, rolling, roller coating, flow coating, laminating, in-mold coating or coextrusion.

The coatings are generally dried and cured under normal temperature conditions, i.e., without heating the coating. Alternatively, the mixtures of the invention may be used to produce coatings which following application are dried and cured at elevated temperature, e.g., at 40-250° C., preferably 40-150° C., and especially from 40 to 100° C.

Despite the fact that certain publications relating to the preparation of water-emulsifiable polyisocyanates, such as DE-A1 40 01 783, EP-A2 206 059, EP-A2 486 881, EP-A1 540 985 or DE-A1 199 58 170, include mixtures of isocyanurates and/or biurets of 1,6-diisocyanatohexane (HDI) and isocyanurates of 1-isocyanato-3,5,5-trimethyl-5-isocyanatomethylcyclohexane (IPDI) with emulsifiers within long lists of suitable starting isocyanates, it was impossible for the skilled worker to infer from any of the abovementioned publications any specific indication whatsoever that the mixtures according to the invention exhibit improved hardness, an improved increase in hardness, and a ready emulsifiability at the same time. Moreover, as compared with the prior art, the mixtures according to the invention exhibit a longer "potlife", this being the period of time within which a batch remains usable after all of the constituents have been mixed, and does not, for example, undergo separation or premature curing.

The examples which follow are intended to illustrate the properties of the invention but without restricting it.

EXAMPLES

In this specification, unless indicated otherwise, parts are to be understood as meaning parts by weight.

Tests

All specimens were tested in the formulation given below:

Binder Dispersion

| | |
|---|---|
| 240 p | Daotan ® 1225 (from Solutia) |
| 119 p | Plusaqua ® V 608 (from Omya) |
| 310 p | distilled water |
| 18 p | Fluorad ® FC 430 (from 3M) |
| 9 p | AMP 90 (from Angus Chemie) |

One part of the polyisocyanate was added with stirring to one part of this binder dispersion (amounts relate to nonvolatile weight fractions).

The finished emulsion was applied with a 200 µm doctor blade to a degreased metal panel and was flashed off at room temperature for 20 minutes before the painted panel was baked in a gradient oven for 30 minutes. Prior to testing, the finished panels were stored for 24 hours under standard conditions (50% humidity, 23° C.). The hardness of the paint films was then measured by means of a pendulum damping test in accordance with DIN 53157 (König hardness). Measurements are indicated in pendulum swings (the higher the number of pendulum swings, the harder the paint film).

Isocyanate A1:
   HDI isocyanurate having an NCO content of 22.2% and a viscosity at 23° C. of 2.8 Pas Isocyanate A2:
   HDI biuret having an NCO content of 22.0% and a viscosity at 23° C. of 6.4 Pas Isocyanate B:
   IPDI isocyanurate having an NCO content of 17.2% (Vestanat® T 1890/100 from Degussa)

Abbreviations:
   HDI hexamethylene diisocyanate
   IPDI isophorone diisocyanate
   PC propylene carbonate
   p parts by weight

Example I

Isocyanate A1 Hydrophilicized, Isocyanate B not Hydrophilicized

Example 1

Isocyanate a1 Hydrophilicized=Isocyanate a1

600.5 g (1.20 mol) of a monofunctional polyethylene oxide with a molecular mass of 500, prepared starting from methanol, are added to 3 560 g (18.8 eq NCO) of isocyanate A1. After 3 hours at room temperature, hydrophilicized isocyanate a1 is obtained, with an NCO content of 17.1% and a viscosity of 2.4 Pas. The pure isocyanate a1 obtained can, it is true, be emulsified effectively in water by simple stirring, to give a fine emulsion, but exhibits a slow increase in hardness and a low ultimate hardness. Isocyanate a1 is mixed with isocyanate B at 100° C. in the proportions indicated in table 1. Like isocyanate a1 itself, the mixtures obtained can be emulsified effectively in water by simple stirring, to produce fine emulsions, but have more rapid increases in hardness and higher ultimate hardnesses (table 2).

TABLE 1

Isocyanate A1 hydrophilicized, isocyanate B not hydrophilicized

| Example No. 1 | Isocyanate a1 (% by weight) | Isocyanate B (% by weight) | NCO content (%) |
|---|---|---|---|
| 1 | 85 | 15 | 16.8 |
| 2 | 75 | 25 | 16.9 |
| 3 | 70 | 30 | 16.9 |
| Comparative, C | 100 | — | 16.8 |

TABLE 2

Hardness increase and ultimate hardness of examples 1.1 to 1.3 and comparative

| Baking temp. [° C.] | Pendulum damping | | | |
|---|---|---|---|---|
| | 1.1 | 12 | 1.3 | C |
| 60 | 37 | 41 | 41 | 32 |
| 70 | 54 | 58 | 60 | 47 |
| 80 | 76 | 74 | 91 | 62 |
| 90 | 81 | 98 | 104 | 72 |
| 100 | 105 | 115 | 122 | 81 |
| 110 | 106 | 119 | 125 | 83 |
| 120 | 107 | 122 | 127 | 86 |

Example II

Isocyanate A1 and B Hydrophilicized

Example 2

Solvent-free Isocyanate B Hydrophilicized=Isocyanate b1

60 g (0.246 eq NCO) of isocyanate B were added to 6.7 g (0.007 mol) of a monofunctional polyethylene oxide with a molecular mass of 1 000, prepared starting from methanol, and the components were stirred at 130° C. for 80 minutes. The mixture was then cooled to room temperature. The product is a solid polyisocyanate (=b1) having an NCO content of 15.2%. The pure hydrophilicized isocyanate b1 can be emulsified in water to give a white, coarse emulsion only with considerable mechanical effort.

By preparing a mixture of isocyanate a1 from example 1 and b1 at 100° C. a readily emulsifiable product is obtained which exhibits better emulsifiability and good properties in respect of the hardness of the coating.

TABLE 3

Isocyanates A1 and B hydrophilicized

| Example No. 2 | Isocyanate a1 (% by weight) | Isocyanate b1 (% by weight) | NCO content (%) |
|---|---|---|---|
| 1 | 95 | 5 | 16.5 |
| 2 | 85 | 15 | 16.6 |
| 3 | 75 | 25 | 17.0 |
| 4 | 70 | 30 | 17.1 |
| Comparative, C | 100 | — | 16.4 |

TABLE 4

Hardness increase and ultimate hardness of examples 2.1 to 2.4 and comparative

| Baking Temp. [° C.] | Pendulum damping | | | | |
|---|---|---|---|---|---|
| | 2.1 | 2.2 | 2.3 | 2.4 | C |
| 60 | 24 | 28 | 32 | 42 | 26 |
| 70 | 39 | 58 | 53 | 62 | 40 |
| 80 | 55 | 72 | 70 | 76 | 50 |
| 90 | 62 | 80 | 73 | 94 | 58 |
| 100 | 69 | 91 | 85 | 107 | 67 |
| 110 | 71 | 94 | 96 | 109 | 70 |
| 120 | 72 | 96 | 100 | 111 | 73 |

Example III

Isocyanate A2 Hydrophilicized and Isocyanate B not Hydrophilicized

Example 3

Isocyanate A2 Hydrophilicized=Isocyanate a2

126.3 g (0.25 mol) of a monofunctional polyethylene oxide with a molecular mass of 500, prepared starting from methanol, are added to 800 g (4.19 eq NCO) of isocyanate A2. After 3 hours at 70° C., hydrophilicized isocyanate a2 is obtained, having an NCO content of 17.2% and a viscosity of 6.3 Pas. The pure isocyanate a2 obtained can be emulsified effectively in water but exhibits only poor paint hardness properties.

By preparation of a mixture of isocyanate a2, isocyanate B, and propylene carbonate, a water-emulsifiable product is obtained which exhibits a substantially higher paint hardness than a2 alone.

TABLE 5

Isocyanate A2 hydrophilicized, isocyanate B not hydrophilicized

| Example 3 | Isocyanate a2 (% by weight) | Isocyanate B (% by weight) | PC (% by weight) | NCO content (%) |
|---|---|---|---|---|
| 1 | 64 | 16 | 20 | 13.5 |
| 2 | 72 | 8 | 20 | 13.1 |
| Comparative C | 80 | — | 20 | 13.4 |

TABLE 6

Hardness increase and ultimate hardness of examples 3.1 to 3.2 and comparative

| Baking temp. [° C.] | Pendulum damping | | |
|---|---|---|---|
| | 3.1 | 3.2 | C |
| 60 | 11 | 16 | 10 |
| 70 | 32 | 30 | 30 |
| 80 | 55 | 53 | 52 |
| 90 | 76 | 74 | 62 |
| 100 | 96 | 85 | 69 |
| 110 | 96 | 89 | 72 |
| 120 | 109 | 92 | 88 |

Example IV

Isocyanate A2 Hydrophilicized and Isocyanate B Hydrophilicized

Example 4

Solvent-containing Hydrophilicized Isocyanate B=Isocyanate b2

14 g (0.014 mol) of a monofunctional polyethylene oxide with a molecular mass of 1 000, prepared starting from methanol, were added to a solution of 125 g (0.51 eq NCO) of isocyanate B in 53.6 g of Solvesso® 100 (about 28% by weight). The mixture is stirred at 85° C. for 3 hours and, after cooling, gives a turbid, viscous paste having an NCO content of 11% isocyanate b2, which with considerable mechanical effort can be converted into an aqueous, coarse emulsion.

By preparation of a mixture of isocyanate a2 from example 3, isocyanate b2, and propylene carbonate, water-emulsifiable products were obtained which exhibit substantially better paint hardness properties than a2 alone and an improved emulsifiability as compared with b2 alone.

TABLE 7

Isocyanates A2 and B hydrophilicized

| Example No. 4 | Isocyanate a2 (% by weight) | Isocyanate b2 (% by weight) | Propylene carbonate (% by weight) | NCO content (%) |
|---|---|---|---|---|
| 1 | 56 | 24 | 20 | 12.5 |
| 2 | 64 | 16 | 20 | 12.7 |
| Comparative, C | 80 | — | 20 | 13.7 |

TABLE 8

Hardness increase and ultimate hardness of examples 4.1 and 4.2 and comparative

| Baking temp. [° C.] | Pendulum damping | | |
|---|---|---|---|
| | 4.1 | 4.2 | C |
| 60 | 18 | 18 | 10 |
| 70 | 24 | 33 | 30 |
| 80 | 45 | 49 | 52 |
| 90 | 65 | 67 | 62 |
| 100 | 86 | 85 | 69 |
| 110 | 97 | 98 | 72 |
| 120 | 105 | 98 | 88 |

We claim:

1. A water-emulsifiable isocyanate composition comprising:
   (C) at least one emulsifier obtained by reacting (A) an isocyanurate and/or biuret of 1,6-diisocyanatohexane (HDI) with at least one emulsifier (C1) comprising at least one isocyanate-reactive group and at least one nonionic hydrophilic group, and excluding an isocyanate of 1-isocyanato-3,5,5-trimethyl-5-isocyanatomethylcyclohexane (IPDI) from (C);
   (B) an isocyanurate of 1-isocyanato-3,5,5-trimethyl-5-isocyanatomethylcyclohexane (IPDI); and
   (D) optionally, a solvent.

2. The composition as claimed in claim 1, wherein component (C1) is at least one polyalkylene oxide polyether alcohol, obtained by reacting at least one saturated aliphatic alcohol, having 1 to 4 carbon atoms in the alkyl radical, with ethylene oxide, propylene oxide or a mixture thereof.

3. The composition as claimed in claim 2, wherein the polyalkylene oxide polyether alcohol contains, on average, from 5 to 35 ethylene oxide units per molecule.

4. The composition as claimed in claim 1, wherein the solvent (D) is present and a carbonic ester or lactone is used as solvent (D).

5. The composition as claimed in claim 1, wherein the solvent (D) is present and in amounts up to 60%, by weight, based on the composition.

6. A polymer dispersion, comprising the composition as claimed in claim 1, and one or more additives.

7. A coating composition, comprising the composition as claimed in claim 1, and one or more additives.

8. A method of coating a substrate, comprising applying the composition as claimed in claim 1, as a coating material, to the substrate.

9. The method of claim 8, wherein the substrate is selected from wood, wood veneer, paper, paperboard, cardboard, textile, leather, nonwoven, plastic surfaces, glass, ceramic, mineral building materials, coated metals or uncoated metals.

10. A method of adhesively bonding substrates, comprising, applying the composition as claimed in claim 1, to at least one substrate.

11. A coating composition, comprising the polymer dispersion as claimed in claim 6, and one or more additives.

12. A method of adhesively bonding substrates, comprising, applying the polymer dispersion of claim 6, to at least one substrate.

13. The composition as claimed in claim 1, wherein, by weight of the composition in solvent-free form, (B) is present in an amount of 5-60% by weight, and before the reaction of (A) with (C1), (A) is present in an amount of 40-90% by weight, and (C1) is present in an amount of 5-40% by weight.

14. The composition as claimed in claim 1, wherein the solvent (D) is not present.

* * * * *